March 19, 1968  D. V. TINDER ET AL  3,374,372

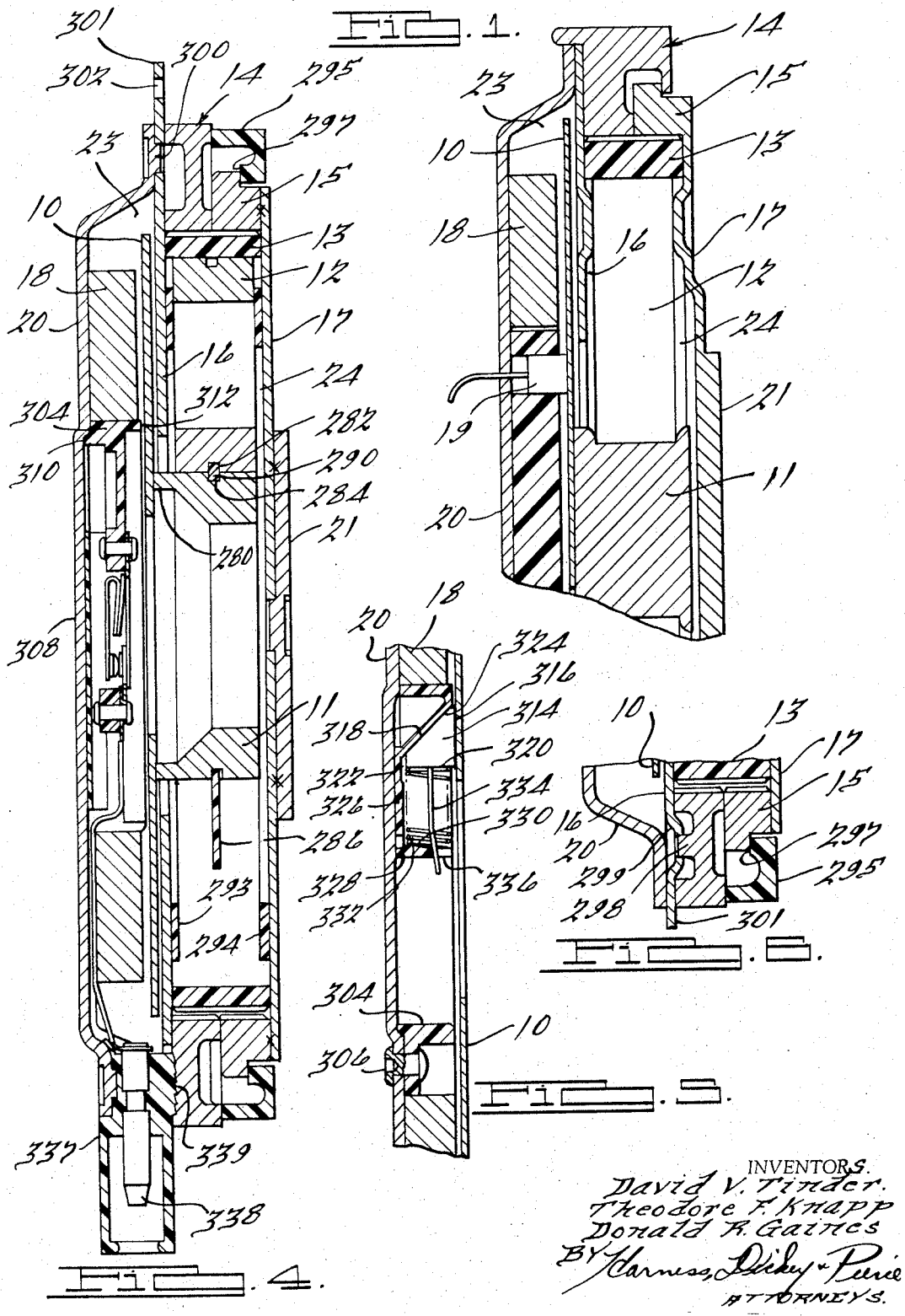

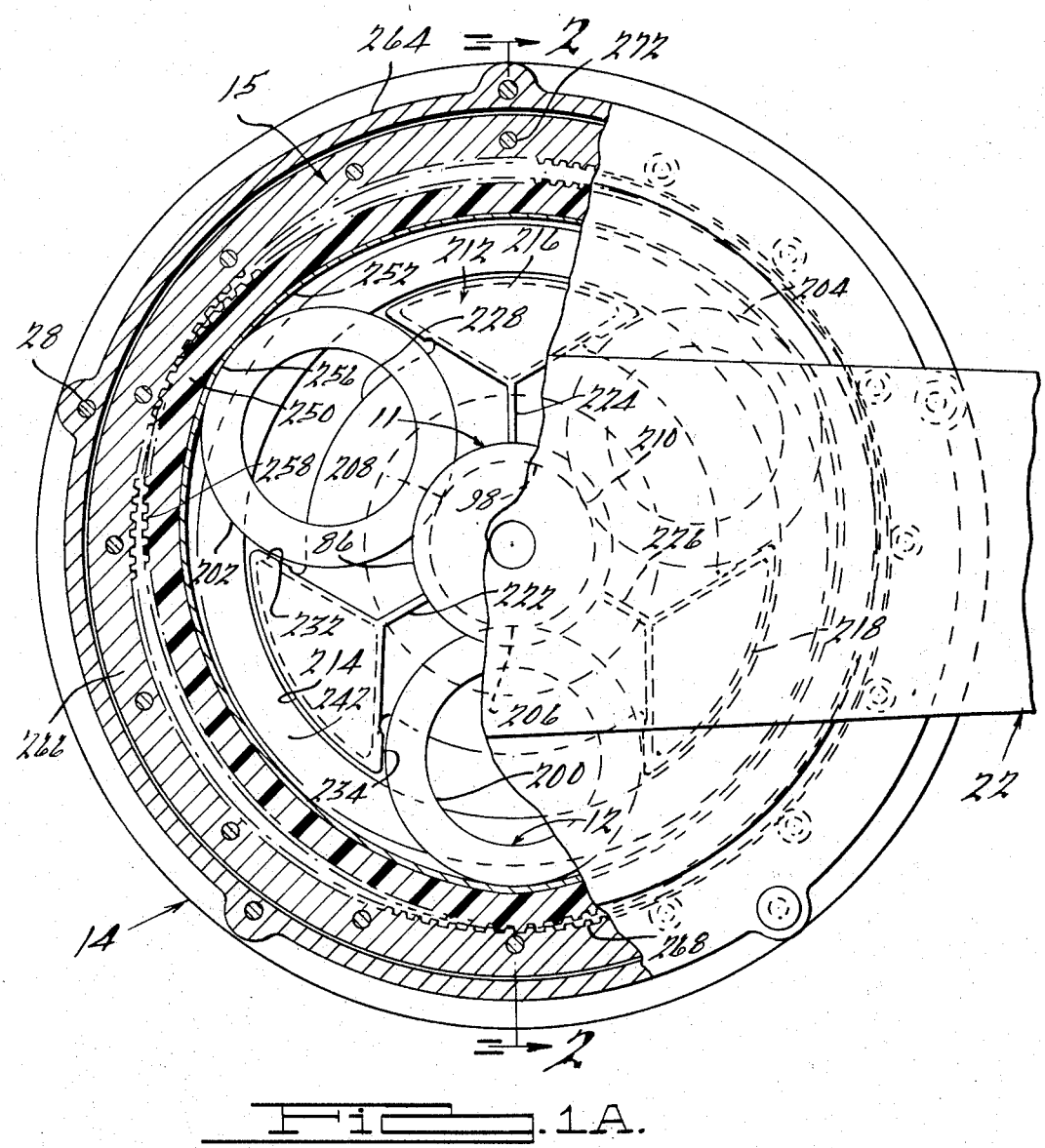

ACTUATOR

Filed Sept. 16, 1964  4 Sheets-Sheet 3

INVENTORS.
David V. Tinder.
Theodore F. Knapp
Donald A. Gaines
BY Harness, Dickey & Pierce
ATTORNEYS March 19, 1968  D. V. TINDER ET AL  3,374,372
ACTUATOR
Filed Sept. 16, 1964  4 Sheets-Sheet 4

INVENTORS.
David V. Tinder.
Theodore F. Knapp
Donald R. Gaines.
BY Barnes, Kisker & Pierce
ATTORNEYS

# United States Patent Office 3,374,372
Patented Mar. 19, 1968

3,374,372
ACTUATOR
David V. Tinder, Detroit, and Theodore F. Knapp and
Donald R. Gaines, Farmington, Mich., assignors to
Dura Corporation, a wholly owned subsidiary of Walter
Kidde & Company, Inc., Oak Park, Mich., a corporation of New York
Filed Sept. 16, 1964, Ser. No. 396,978
51 Claims. (Cl. 310—80)

ABSTRACT OF THE DISCLOSURE

There is herein disclosed a power actuator for a vehicle window or the like comprising a disc motor and a harmonic transmission cooperably mounted in a pancake type housing.

---

This invention relates to a power actuator and more particularly to a new and improved combination of an electric motor utilizing a disk type armature and a reduction unit utilizing harmonic drive.

The present invention has particular utility as an actuator unit for applications presenting rather restrictive space limitations. For example, the relatively small and compact actuator units of the present invention may be associated with concealed operating mechanisms in vehicles which are utilized to operate windows, vents, doors, tailgates, and the like. Such actuators generally are mounted in confined areas and must be reliable self-contained units which require minimum or no maintenance. The actuators utilize small motors and are desirably operable by low voltage which produces high torque. Of course, the cost of the units must be kept as low as possible while maintaining the desired reliability and obtaining the necessary high performance characteristics.

A general object of this invention is to provide new and improved power actuator means.

Another general object of the present invention is to provide new and improved actuator means of reduced size comprising a novel motor and transmission arrangement.

Still another object of the present invention is to provide new and improved actuator means in which the number of parts, and hence the cost of manufacture, have been materially reduced.

A more specific object of the present invention is to provide, in combination, an electric motor having a disk-type armature and a harmonic drive unit forming a pancake type actuator assembly.

Another specific object of the present invention is to provide a combination electric motor having a disk-type armature and a harmonic drive arrangement mounted within a common casing and supported therein without the use of conventional bearing means.

Still another specific object of the present invention is to provide an arrangement of harmonic drive means and electric motor means operable by low voltage to produce high torque output.

Other objects and many of the advantages of the present invention will become apparent to those skilled in the art to which this invention relates by reference to the following detailed description of the inventive principles as illustrated on the accompanying drawings, wherein:

FIGURE 1 is a partial cross-sectional view of an actuator showing the basic components of the present invention;

FIGURE 1A is a plan view of a self-powered actuator unit incorporating the inventive principles;

FIGURE 4 is a cross-sectional view of a presently preferred embodiment of the inventive principles;

FIGURE 5 is a partial sectional view of a portion of the apparatus shown in FIGURE 4;

FIGURE 6 is a partial sectional view of another portion of the apparatus shown in FIGURE 4;

Figures 2, 3:
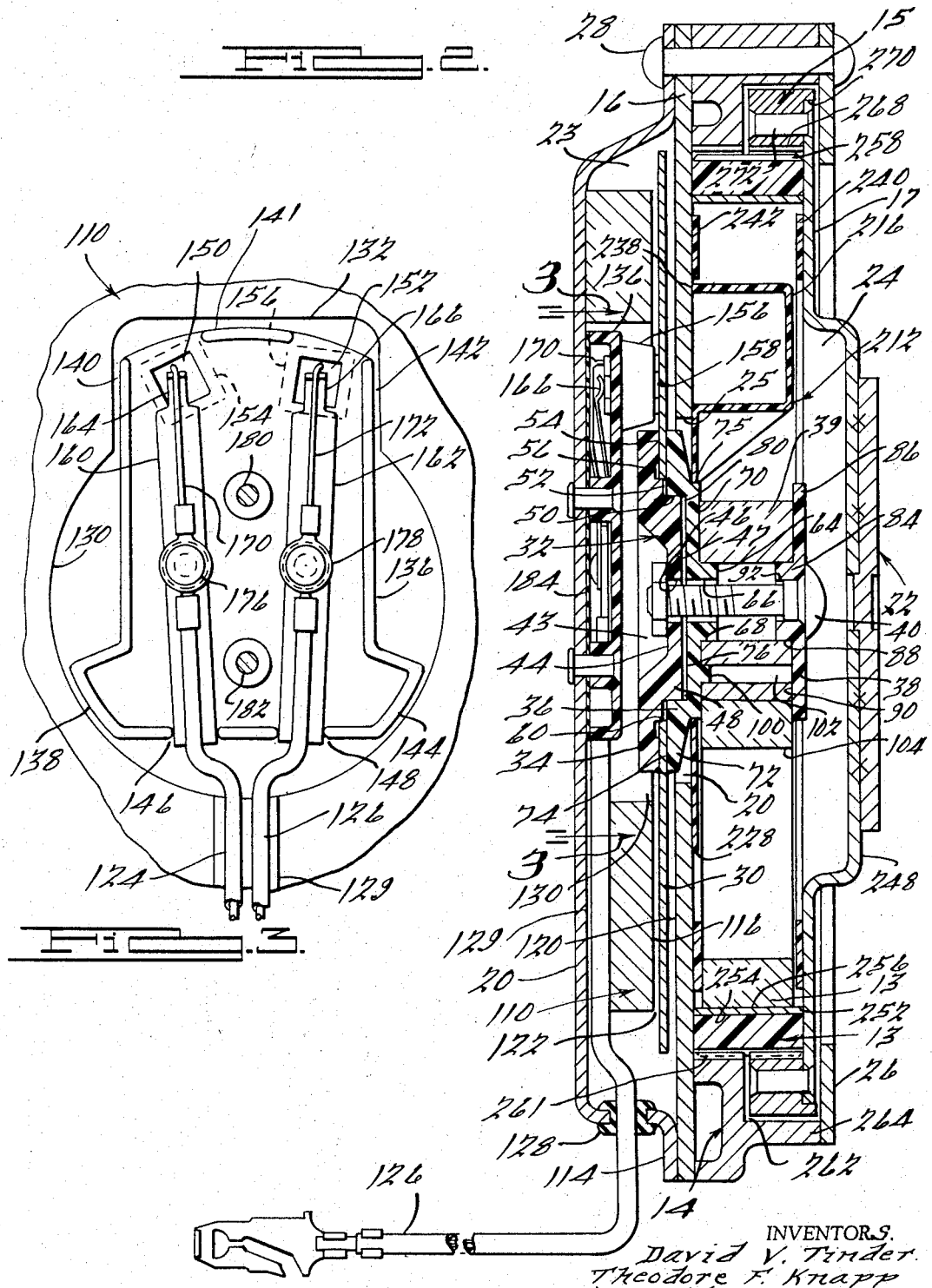
FIGURE 2 is a cross-sectional view of the apparatus shown in FIGURE 1A.
FIGURE 3 is a sectional view taken along the line 3—3 in FIGURE 2.

The basic components of the invention are shown somewhat schematically in FIGURE 1. It is to be understood that the other portion of the actuator which is not shown is generally symmetrical to and the same as the portion shown. In general, a rotatable element of an electrical motor is connected through suitable rotatable transmission means to suitable output means with the motor means, the transmission means, and the output means interconnected and interrelated to form a unitary actuating device. More specifically, the rotatable element comprises a disk-type armature 10 suitably mounted on and connected to the rotatable transmission means through sun roller means 11 forming a part thereof. The armature and sun roller means form an integral rotatable component. A plurality of planet roller means 12 are driven by and rotatably support the sun roller means. The sun roller and the planet rollers form a wave generator means for a purpose to be hereinafter described in detail. The planet roller means actuate harmonic drive members which include an annular flex spline 13, a fixed annular splined member 14 that coacts with the flex spline, and a movable annular splined member 15 that also coacts with the flex spline. Thus, it will be seen that the fixed member 14 surrounds and radially locates each of the movable elements 10, 11, 12, 13 and 15. The sun roller means, planet roller means, and harmonic drive members 13, 14, 15 are parts of speed reduction means by which the output (e.g., revolutions per minute of the movable spline 15) may be greatly reduced relative to the input (e.g., revolutions per minute of the armature 10 and sun roller means 11). It will be understood that the positions and coaction of the fixed spline and the movable spline may be modified and even reversed.

One of the features of the invention is that the armature is supported directly only by the sun roller means, and indirectly by the planet roller means and the harmonic drive members. Suitable axial spacing and thrust means, including plates 16, 17 and fixed spline 14, coact directly with only portions of the reduction means including the planet roller means and only indirectly with the armature and the sun roller. It will be understood that suitable bearing means in the form of plastic rings and plate members may be provided as necessary or desirable between any of the relatively moving parts.

Armature 10 and plate 16 form part of electric motor means including magnet means 18, brush means 19, and a cover plate 20 which also serves to form a flux path with the plate 16. In the illustrative embodiments, a permanent magnet in ring form is shown. It is to be understood that other motor magnet forms may also be utilized. For example, a printed disk-type magnet or wire wound form could be used.

Thus, a greatly simplified and compact actuator is provided wherein only basic components of a motor and reduction means are utilized, and wherein various components of each have multiple functions and are utilized in and form parts of the other. The output may be transferred to a device to be actuated by any suitable mechanism which may be operably connected to the output spline 15 in any suitable manner such as, for example, by welding on the boss 21.

It will be readily appreciated and understood by those skilled in the art to which this invention relates that the details of construction and arrangement of the various parts and the operation of the actuator are subject to wide variation without departing from the basic inventive principles disclosed.

Certain presently preferred embodiments of these inventive principles are hereinafter described in detail by further reference to the drawings.

Referring now to FIGURES 1A and 2, the aforedescribed basic components are illustratively shown to be operably connected to linkage means 22 in the form of an actuator arm or link which may be suitably connected to, for example, window operating mechanism within the door of an automobile or the like. The self-contained power operated actuator is preferably sealed within a substantially cylindrical relatively narrow or thin, e.g., approximately 1½ to 1¾ inches, casing defined by the various components of the actuator as hereinafter described in detail. In general, the interior of the power actuator is divided into a motor compartment 23 and a compartment 24 for the speed reducing mechanism. The two compartments of the casing are separated and defined by the central plate 16 and are connected by a central aperture 25 in that plate through which the electric motor and the speed reduction mechanism are connected. The casing is defined by the cover plate 20, the central plate 16, the fixed spline member 14, and side plate 26 which are connected by suitable means 28. Plate 17 fixed to the movable spline closes one side of the actuator.

Referring now in detail to FIGURE 2, the electric motor is of the type utilizing a relatively thin, e.g., approximately 1⁄32 of an inch, disk-like armature 30 as described in detail in copending application, Ser. No. 288,152, filed June 17, 1963, and assigned to the assignee of the present invention. The theory of operation of the subject motor is described in detail in the aforementioned copending application and the general theory of operation is well understood by those skilled in the electrical motor art. The motor armature 10 comprises a disk formed from a plurality of layers of copper conductor segments and insulation means as described in detail in the aforementioned copending application. In the preferred embodiment, each layer of conductor segments has a substantially identical pattern and each conductor segment in each layer is identical. The ends of the conductor segments in the different layers are connected together to form a continuous wave winding. Portions of the conductor segments on one outer face of the armature also serve as commutator bars. Although the disk-type armature disclosed in the aforementioned copending application is preferred because of its remarkably high torque output, certain features of the present invention are adaptable for use with other types of electric motors utilizing other types of armature construction.

Armature disk 30 is fixedly mounted on centrally located rotatable hub means 32 comprising an outer flanged hub portion 34, a centrally located flanged hub portion 36, another flanged hub portion 38, an annulus 39, and fastening means 40. The flanged hub portions 36, 38, the annulus 39, and the fastening means 40 also form part of the speed reduction mechanism as hereinafter described in detail. The hub portions may be made of a plastic insulating material such as Delrin or, for example, nylon.

Flanged hub portion 34 comprises a substantially flat outer face in which a tapered recess 43 is formed. A shoulder 44 is formed at the bottom of the recess and an aperture 46 is centrally located therein. The inner face 47 of the flanged hub is stepped to provide a central hub 48 terminating in a transverse shoulder 50. A radially outwardly extending surface 52 intersects shoulder 50 and is axially offset from an abutment surface 54. A ring-like groove 56 separates the surfaces 52, 54 and the inner periphery of the disk armature 30 is seated is seated on a shoulder 60 therebetween.

The flanged hub portion 36 comprises a central hub 64 having an aperture 66 adapted to receive the fastening means 40. A seat 68 and an abutment wall 70 are provided on one side of the flanged hub portion 36. A backup flange 72 for the disk armature extends radially outwardly and includes an abutment surface 74 adapted to engage the inner side surface of the armature disk opposite the abutment surface 54. An annular seat 75 is provided and an annular recess 76 is formed in the flanged hub portion 36. Recess 76 has a diameter substantially equal to the diameter of the hub 48 which is adapted to be fixedly matingly received therein. The depth of the recess 76 is sufficiently greater than the height of the hub 48 so that when the flanged hub portions are assembled a sufficient gap 80 exists therebetween to permit ready assembly and a tight fit of the armature between the flanges. The diameter of the backup flange 72 is such that it is readily received within the aperture 25 in the central plate 16. The flanged hub portion 38 includes a central hub 84 and a flange 86. A seat 88 and a backup surface 90 are formed by the hub 84 and the flange 86. The diameter of the hub 84 is the same as the diameter of the hub 64.

Fastening means 40 may take the form of a bolt, or the like, having a head portion which is abuttingly received against the outer surface of the hub portion 38 and extending through the central apertures in the flanged hub portions. A nut, or the like, threadably associated with the shank of the bolt, secures the various flanged hub portions in the relationship shown with the disk armature fixedly secured between the flanges 34 and 72.

The flanged hub portions 36, 38 are held in spaced relationship by annular ring 39 fixedly supported therebetween by means of suitably spaced pins 100 on hub portion 36 located in apertures 102. In the preferred embodiment, three such pins and apertures spaced apart 120° are used. The ring 39 may be made of steel or other suitable material and forms a sun roller element having its outer annular surface 104 drivably engaged with a planetary roller system as hereinafter described in detail.

The electric motor further comprises a ring-type permanent magnet 110 which is fixedly secured to the cover plate 20 by suitable means such as adhesive bonding. The magnet ring 110 is provided with a suitable number, for example 10, of circumferentially spaced alternate N–S poles. In the embodiment having the preferred disk armature 30 hereinbefore described, the number of pole pairs is an odd number. That is, the number of poles provided by the ring is a number such as 6 or 10 (there being, respectively, three north poles and three south poles with a six pole arrangement and five north poles and five south poles with a ten pole arrangement) such that the number of pole pairs (an opposite north and south pole) is equal to an odd number. A six pole magnet provides three pole pairs and a ten pole magnet provides five pole pairs. Cover 20 and plate 16 are formed of a material, such as low carbon steel, suitable for providing a return path for magnetic flux in operation of the electrical motor. The cover may be provided with an annular flange portion 114 which provides means for abuttingly connecting the cover to the central plate. The inner surface 116 of the magnetic ring is spaced from the adjacent surface 120 of the dividing plate 16 a suitable distance to provide a gap 122 within which the disk armature 30 is mounted in spaced relation to both inner surfaces 116, 120.

The electric motor is connected to a low voltage source through suitable lead-in conductor means 124, 126 extending through a grommet 128 in the wall of the cover plate 20 and through a suitable passage 129 in the ring magnet 110 into a central substantially annular cavity 130 defined by the ring magnet. As shown in FIGURE 3, the central cavity 130 is provided with a rectangular portion 132 at one end which forms key means for properly locating and supporting the ring magnet in the desired position. The key-shaped aperture 130 provides means for cooperably mounting the ring magnets about a terminal-brush assembly housing 136 having spaced locating surfaces 138, 140, 141, 142, 144 for cooperably positioning the ring magnet. The lead-in conductors 124, 126 extend into the terminal-brush assembly housing through suitable apertures 146, 148 and are connected therein in a suitable manner to brush elements 150, 152 which extend axially inwardly through housing portions 154, 156. Brushes 150, 152 engage the conductor segments on the outer face of the disk armature as shown at 158, FIGURE 2, and commutate the wave winding formed on the disk armature in a conventional manner. Suitable spring blades 160, 162 having finger portions 164, 166 engageable with the inner ends of the brushes are provided to spring-load the brushes against the inner face of the disk armature. The electrical connections may be provided by conductors 170, 172 extending from contact posts 176, 178. The brush holder assembly is secured to the cover plate 20 by suitable fastening means such as rivets 180, 182, as shown in FIGURE 2, and suitable insulation means 184 may be provided between the plate 20 and the brush housing 136.

The reduction means of the present invention is in the general form of a harmonic drive, the details of which are fully disclosed in the U.S. patent to Musser 2,906,143. In general, the reduction means consists of, in addition to the sun roller 39, a planetary arrangement including planet roller means 200, 202, 204, FIGURE 1A, which are drivably engaged with the sun roll as indicated at 206, 208, 210. Sun roller 39 and planet rollers 200, 202, 204, are preferably made of steel. The spatial relationship of the planet rollers is maintained by a separator element 212 comprising spaced generally triangularly shaped axially extended spacing means 214, 216, 218 which are connected by webs 222, 224, 226 to a hub portion 228 mounted on and seated against the surface 75 formed on the flanged hub portion 36. Each of the spacing means 214, 216, 218 are provided with abutment surfaces 232, 234 for substantially tangential engagement with the periphery of adjacent planet rollers at points located radially outwardly from the sun roll beyond the centers of the planet rollers. Separator 212 is loosely abuttingly seated on the annular rim 75. The planet roller means are axially located by guide means 240, 242 in the form of ring elements mounted between the planet rollers and dividing plate 16 and plate 17 which terminates in an axially offset output hub 248. An annular flex spline 13 is mounted circumjacent the planet rollers. An annular wear ring or race 252, formed of a material, such as steel, is mounted between the roller elements and the flex spline in abutting engagement with both as indicated at 254, 256. The race has an interference fit with the flex spline. The outer periphery of the flex spline is provided with a large number, e.g., 397 in the illustrative embodiment, of equally spaced teeth 258 extending completely around the flex spline and from side to side thereof. The separator, ring elements, and flex spline are preferably formed of Delrin or other suitable material such as nylon.

Fixed spline 14 is fixedly mounted between the plates 16, 26 and also forms a portion of the peripheral wall of the housing. The fixed spline has three more teeth 261 than the flex spline, e.g., 400 in the illustrative embodiment, extending completely about its inner periphery for mating engagement with portions of the teeth 258 on the flex spline. An annular cavity 262 is provided between part of the flex spline and the fixed spline by an annular flange 264.

Movable output spline 15 is mounted in the cavity 262 and includes a toothed portion 268 of 397 teeth in mating engagement in three circumferentially spaced areas with the flex spline teeth. The outer side surface of the movable spline is provided with an annular seat 270 on which the annular plate 17 is fixedly secured by suitable fastening means 272. Actuating arm 22 is suitably mounted on the output hub 248 as by welding. The fixed spline and the movable spline are, preferably, formed from a strong lightweight metal such as aluminum.

It will be noted that the armature of the motor is more or less freely rotatably supported within the cavity 23 except for the support provided through the reduction means. There is in effect no armature support shaft and shaft bearing arrangement as found in conventional devices. Consequently, lubrication and wear problems have virtually been eliminated. It may be noted that the thrust and bearing surfaces are primarily provided by plastic parts which require no lubrication and substantially isolate the reduction members and the armature from direct contact with any of the side walls of the casing.

Whenever the actuator motor is to be operated, current is applied to the series wound wave winding on the armature through the conductors 124, 126 and the brush assemblies 150, 152. The current flows radially through the conductor portions of the winding and cuts the lines of magnetic flux extending across the gap 122 to the return plate 16 to create magnetic fields which cause the armature to rotate about its central axis at a speed of, for example, between approximately 3,000 and 4,000 r.p.m. with high output.

Sun roller 39 is rotated and drives the planet rollers 200, 202, 204 around the flex spine 13. In the illustrative embodiment, with three planet rollers a 5:1 reduction is obtained. The flex spline is flexed in and out of engagement with the movable spline 15, which has an equal number of teeth, and the fixed spline 14 which has three teeth more than the flex spline and movable spline. Consequently, a tooth ratio of 3 in 400, i.e., 1:133 is effected. The overall reduction is thus approximately 665:1 whereby 665 revolutions of the sun roller results in 1 revolution of the movable spline. Flex spline 13 drivingly engages the movable spline and causes rotation of the output hub 248 to impart the desired movement to the controlled mechanism through the output means 22.

Figure 8:
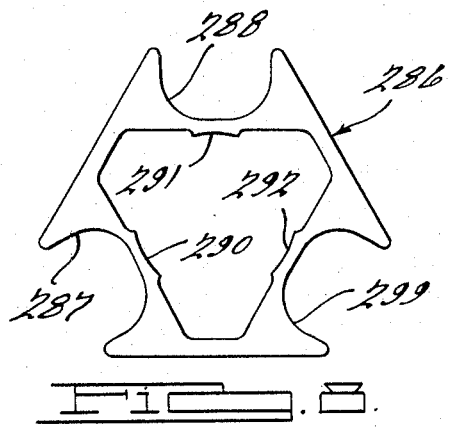
FIGURE 8 is a plan view of an element shown in FIGURE 4.

Referring now to FIGURE 4, a presently preferred embodiment of the invention is shown. Armature 10 is directly connected to sun roller 11 by, for example, a suitable adhesive bond along an annular abutment surface 280. Planet rollers 12 are provided with centrally located peripheral grooves 282. Sun roller 11 is provided with a similar groove 284. A separator 286 for the planet rollers, shown in detail in FIGURE 8, is mounted in the grooves 282, 284 and serves the dual function of spacing the planet rollers and axially locating the sun roller relative to the planet rollers. The planet rollers are seated in the recesses 287, 288, 289 while tab portions 290, 291, 292 extend into the groove 284 in the sun roller. Separator 286 is made of a material such as Delrin which has sufficient resiliency to be snapped into the sun roller groove 284 by resilient deflection and sufficient rigidity when in place to maintain proper axial alignment of the sun roller relative to the planet rollers. Bearing rings 293, 294 mounted between the walls 16, 17 axially support the planet rollers.

Figure 7:
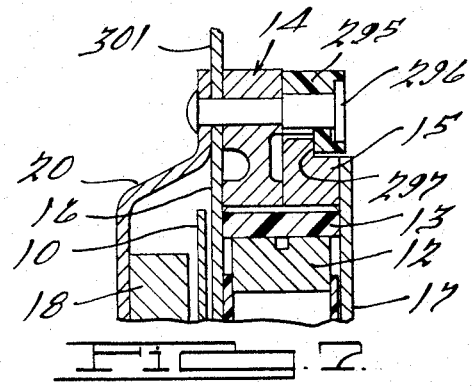
FIGURE 7 is a partial sectional view of another portion of the apparatus shown in FIGURE 4.

Flex spline 13, fixed spline 14, and the movable output spline 15 radially located the reduction rollers and the armature. A plastic retaining ring 295 is fixedly secured to the fixed spline by fastening means 296 as shown in FIGURE 7. A radially inwardly extending flange portion of the retaining ring is provided with a thrust surface 297 adapted to abuttingly engage an overlapping radially aligned surface on the movable spline 15.

The fixed spline 14 may be fixedly located and positioned by means of integral projections 298 received in corresponding apertures in axially offset flange portions 299 of the plate 16 which are illustrated in FIGURE 6. Similarly, as shown in FIGURE 4, the cover plate 20 may be fixedly located and positioned by integral projections 300 received in corresponding apertures in the central plate 16. Radially outwardly extending portions 301 of the central plate may be provided with attachment means such as apertures 302 for mounting the actuator within a vehicle door or the like in use.

Referring now to FIGURES 4 and 5, a preferred brush holder arrangement is shown. A plastic housing 304 is suitably secured by bonding or by fastening means 306 to the plate 20 within a central cavity in the magnet 18. The central portion 308 of the plate 20 opposite the brush holder may be axially offset and receive projections 310. Innermost portions 312 of the brush holder extend axially inwardly toward the armature 10 beyond the magnet 18 and insure that an axial air gap is maintained between the armature and the magnet. Each brush 314 is trapezoidal in side elevation as shown in FIGURE 5 and has an elongated armature contacting surface 316, an inclined slide surface 318, and a spring abutment surface 320. A brush assembly cavity 322 is provided in the housing for each brush and comprises an inclined slide surface 324, a bottom wall 326, and a spring abutment wall 328 with a spring retainer tab 330. Compression spring member 332 is seated over the tab 330 between the wall 328 and the surface 320 of the brush with the brush conductor 334 extending through the spring and a slot 336 in wall 328. A force is exerted by the spring in a direction parallel to the engaging surfaces of the brush and armature and forces the brush to slide outwardly along the inclined surfaces 318, 324 to engage the armature. Consequently, the brush is loaded in two directions and the spring rate may be much lower than in conventional brush assemblies. In operation there is much less vibration and less noise, and the wear rate is reduced.

The electrical connection to the brushes may be obtained through a rubber-like grommet 337 having imbedded terminals 338 and secured in an opening between the cover plate 20 and the fixed spline 14 by an interference fit and a serrated edge 339. It will be understood that the other components and operation of this embodiment are similar to the aforedescribed embodiments of the invention.

Figure 9:
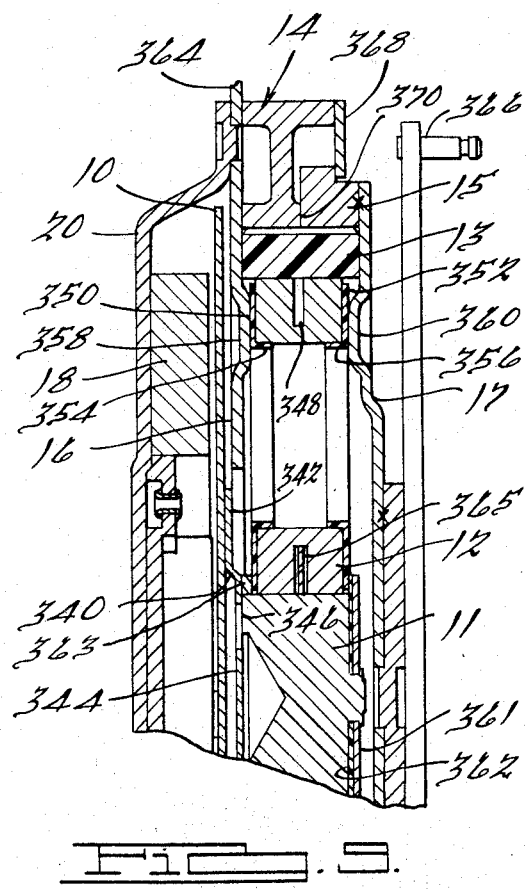
FIGURE 9 is a cross-sectional view of a portion of an alternative embodiment of the inventive principles.

An alternative form of the invention is shown in FIGURE 9 and comprises an armature 10 connected to the sun roller 11 by a flanged disk 340. A peripheral portion 342 of the disk is axially offset and secured to the armature by, for example, adhesive bonding. Similarly, the central portion 344 of the disk is also bonded to the side surface of the sun roller at 346.

The planet roller elements 12 may be ring shaped and have a central circumferential slot 348. Plastic members 350, 352 having integral hubs 354, 356 mounted within the central opening of the planet roller elements separate the roller elements from axial bearing surfaces provided by radially aligned, ring-like, abutments 358, 360 integrally formed in the central plate 16 and outer plate 17. The sun roller is axially retained relative to the planet rollers at one end by means of a plate 361 and a bearing washer 362 staked on the sun roller and at the other end by the armature support disk 340 and bearing washer 363. The central plate may be square with the corners 364 protruding radially to provide fastening tabs by which the actuator may be mounted in use.

A disk-shaped separator element 365, similar to that shown in FIGURE 8 and having generally arcuate peripheral seats adapted to receive the inner annular walls of the slots 348, is mounted circumjacent the sun roller and spaces the planet roller elements.

Plate 17 is welded or otherwise secured to the output spline 15 and supports scissor type output linkage 366. In this embodiment, the movable output spline is axially retained by a plate 368 suitably fastened to the fixed spline 14 and a thrust surface 370 on the fixed spline.

Figure 10:
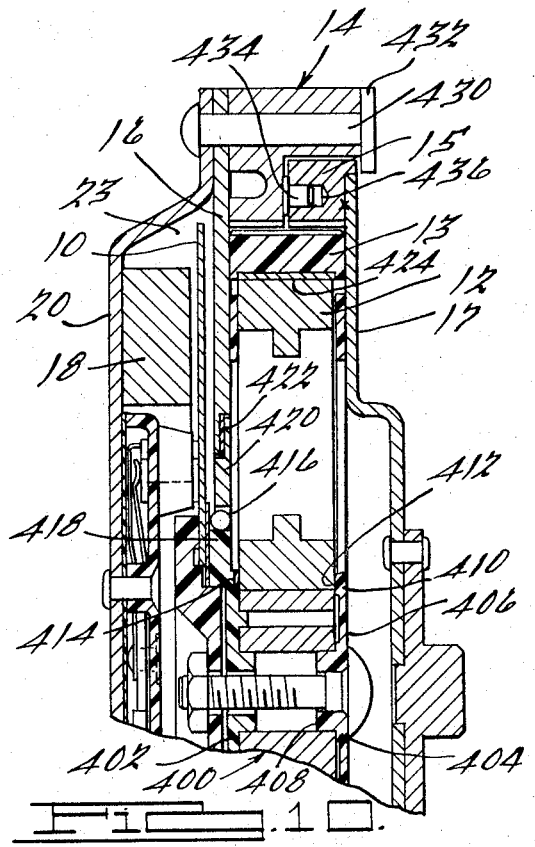
FIGURE 10 is a cross-sectional view of a portion of another alternative arrangement.

Referring now to FIGURE 10, another embodiment of the inventive principles is shown and varies from the aforedescribed embodiments as hereinafter outlined in detail. Sun roller 400 comprises an annulus fixedly mounted between spaced abutments 402, 404. Resilient arms 406 extend radially from the central hub portion 408 of abutment 404 and terminate in an abutment ring 410 which resiliently engages the side surface of the planet rollers at 412. A bearing ring 414 is provided opposite the spring flange abutment. The spring flange is made out of a resilient material such as plastic and is formed with a slight taper such that the normal distance between the bearing ring 414 and the abutment surface 410 is less than the width of the planet rollers.

A one-way clutch 416 of conventional design is provided between a flange extension 418 of the hub and an eddy current ring 420. The clutch may be of the ball and ramp type as illustrated. A bearing ring 422 axially separates overlapping portions of the eddy current disk and the flux return plate 16. This arrangement provides means for varying the output characteristics of the actuator when the direction of rotation of the armature is reversed.

Flex spline 13 is provided with a wear race 424 embedded in a groove in the flex spline. Fastening devices 430 extending through the cover plate 20, the flux plate 16, and the fixed spline 14 have elongated headed portions 432 which overlap and axially locate the movable spline. Thrust members 434 attached to the fixed spline 14 may be utilized to locate and axially position the movable spline by sliding engagement in a circumferential groove 436 in the movable spline.

In the illustrative embodiments of this invention, the motor is adapted to operate on an input voltage of 12 volts with an amperage of 12 amps under load resulting in an output speed of approximately 6 r.p.m. and an output torque of 100 ft.-lb. Such an actuator has a load capacity of about 100 pounds on a 13-inch actuating arm. For 75° travel between a fully retracted position and a fully extended position, a time interval of approximately 5 seconds is required. It is contemplated that the subject actuator will be operable at least in a range of temperatures from −20° F. to 180° F.

The many distinctive features of the invention, and the resulting advantages, will be seen to have varied uses and applications, either in the presently preferred forms disclosed herein or in various alternative forms, by those skilled in the art to which the invention relates. Therefore, it is intended that the appended claims be given a scope and construction commensurate with the broadest aspects of the invention except insofar as limited by the prior art.

What is claimed is:

1. A power operable actuator comprising a casing enclosing an axial air gap type electrical motor, said motor including a rotatable disk motor armature and electrical means for rotatably driving said motor armature, rotatable transmission means having a drive portion and a driven portion within said casing and being driven by said motor armature, means mounting said motor armature on the drive portion of said transmission means whereby energization of said electrical means causes said motor armature to rotate and rotatably drive said transmission means, said motor armature and said drive portion and said driven portion being located between and enclosed by spaced opposite walls of said casing, the driven portion being mounted in radially spaced relationship to the drive portion, and common support means rotatably supporting and axially and radially locating said transmission means and also axially and radially locating said motor armature, the only axial and radial location of said motor armature being indirectly effected by said support means through said transmission means without direct engagement with said common support means.

2. The invention as defined in claim 1 and wherein said electrical means comprises magnet means, spaced radially extending flux plate means, portions of said flux plate means being connected to form an annular compartment and a flux return path from plate to plate, magnet means mounted on one of said plate means in spaced relationship to the other of said plate means to define an air gap therebetween, and said disk type armature extending into said compartment parallel to and spaced from said plate means between the other of said plate means and said magnet means in said air gap.

3. The invention as defined in claim 1 and wherein said drive portion of said transmission means comprises sun roller means of a planetary speed reduction system and said driven portion comprises planet roller means of said system and said common support means engaging said planet roller means and thereby indirectly locating said sun roller means and said motor armature.

4. The invention as defined in claim 3 and wherein said support means further comprises a harmonic drive system having a flex spline surrounding said planet roller means and a fixed spline radially locating said flex spline, said planet roller means, said sun roller means, and said armature.

5. The invention as defined in claim 4 and having radially extending plate means located on both sides of said planet roller means and axially locating said planet roller means, and means fixedly axially locating said plate means relative to said fixed spline.

6. A power operated actuator having a pancake peripheral configuration comprising a rotatable output spline, a fixed spline fixedly mounted relative to said rotatable output spline, means axially restraining said rotatable output spline relative to said fixed spline, a flex spline engaged with and mounted circumjacent said rotatable output spline and said fixed spline, means axially restraining said flex spline relative to said fixed spline and said rotatable output spline, planet roller means mounted circumjacent said flex spline and drivably engaged therewith, sun roller means mounted between said planet roller means and being radially supported thereby, means axially locating said planet roller means relative to said fixed spline, means axially locating said sun roller means relative to said planet roller means, a disk type armature drivably connected to and rotatably supported by said sun roller means, and motor means supported in axial and radial spaced relationship to said armature for imparting rotary motion to said armature to rotate said output spline through said sun roller means, said planet roller means, and said flex spline.

7. The invention as defined in claim 6 and having plastic flex spline and a wear ring mounted between said flex spline and said planet roller means.

8. The invention as defined in claim 7 and wherein the wear ring is embedded in the flex spline.

9. The invention as defined in claim 6 and having separator means mounted circumjacent said sun roller means and circumferentially spacing said planet roller means.

10. The invention as defined in claim 9 and wherein said separator means comprises an annular plate extending radially outwardly along one side of said planet roller means and having axially extending shoe means located between and circumferentially spacing said planet roller means.

11. The invention as defined in claim 9 and wherein said planet roller means having circumferential slots and said separator means comprising an annular plate having portions extending radially outwardly into said slots and other portions extending further radially outwardly between said planet roller means.

12. The invention as defined in claim 6 and having brush means mounted for surface engagement with said armature, support means for said brush means including a slide surface inclined to the plane of engagement of said brush means with said armature, a surface of said brush means being correspondingly inclined and mounted in sliding abutting engagement with said slide surface, and spring means exerting a force on said brush means in a direction parallel to the plane of engagement of said brush means with said armature and toward said inclined slide surface.

13. The invention as defined in claim 6 and having spring means axially positioning said planet roller means relative to said sun roller means.

14. The invention as defined in claim 13 and wherein said spring means comprises abutment means located radially outwardly beyond said sun roller means in engagement with a side surface of said planet roller means, and radially extending resilient flange means supporting said abutment means and being fixedly mounted on said sun roller means.

15. The invention as defined in claim 6 and including speed control means mounted between said fixed spline and said sun roller means.

16. The invention as defined in claim 15 and wherein said speed control means comprises a radially inwardly extending flux plate supported by said fixed spline, and a radially outwardly extending eddy current plate supported between said sun roller means and said flux plate.

17. The invention as defined in claim 16 and including a one-way clutch means mounted between said sun roller means and said eddy current plate.

18. A self-contained power operable actuator unit for association with an operating mechanism in a confined area in an automobile or the like comprising a flat narrow width pancake type casing having a relatively short central axis and a relatively long radial dimension, flat narrow width motor means mounted in said casing and including a disk type armature rotatable about said central axis, narrow width speed reduction means mounted in said casing for movement about said central axis, electrical input means extending to said motor means through said casing, and output means for connection to the operating mechanism connected to said reduction means within said casing and extending substantially radially relative to the central axis and being movable thereabout.

19. The invention as defined in claim 18 wherein said disk type armature is mounted on and supported directly and solely by said reduction means.

20. The invention as defined in claim 18 and said disk type armature and said reduction means having common hub means, and said common hub means being axially spaced from the adjacent side wall of said casing at both ends and completely separated therefrom by axial air gaps.

21. A power actuator for operating a vehicle window or the like in a confined relatively inaccessible area such as within a vehicle door comprising output means for connection to the vehicle window actuating mechanism, reduction means drivably connected to said output means, a flat pancake type actuator casing, support means including said casing rotatably supporting said reduction means, and motor means rotatably mounted within said casing and fixedly secured to said reduction means and rotatably supported solely thereby.

22. The invention as defined in claim 21 and wherein said motor means comprises a disk armature.

23. The invention as defined in claim 22 and comprising stator means formed in part by said casing and mounted in axial spaced relationship relative to said disk armature, and said disk armature being supported in completely spaced relationship relative to said casing.

24. A power actuator or the like having a relatively short central axis and a substantially greater radial dimension comprising a substantially cylindrical casing, centrally located radially extending plate means dividing said casing into a plurality of compartments, transmission means rotatably mounted in one of said compartments, a motor means mounted in the other of said compartments and having a radially extending disk type armature rotatably mounted therein, common support means for said armature and said transmission means extending between said compartments, and the sole support for said armature and said common support means being provided by restraint of said transmission means by said casing whereby said armature is freely rotatably supported within said casing without bearing means or direct surface to surface engagement within said other of said compartments.

25. The invention as defined in claim 24 and wherein said central plate means comprises a flux return plate for said motor, and magnetic means mounted on said casing in said other compartment in axial spaced relationship to said armature.

26. The invention as defined in claim 24 and wherein said magnetic means comprises an annular ring type magnet arrangement secured directly to the interior surface of said casing.

27. The invention as defined in claim 26 and having brush means mounted within said annular ring type magnet arrangement, said brush means extending axially inwardly for engagement with the adjacent side surface of said armature.

28. The invention as defined in claim 27 and wherein said brush means includes a housing having a non-symmetrical peripheral configuration, said housing being fixedly mounted on said casing, and said annular ring type magnet arrangement comprising a continuous rim portion defining a non-symmetrical interior cavity corresponding to said housing and adapted to be mounted about said housing, said non-symmetrical configuration locating said ring type magnet in a predetermined relationship relative to said brush means.

29. The invention as defined in claim 24 and wherein said transmission means comprises sun roller means fixedly connected to said armature, a plurality of planet roller means rotatably supported about said sun roller means, separator means mounted about said sun roller means and spacing said planet roller means, radially extending portions of said separator means having surface to surface engagement with radially extending portions of said plate means, and additional bearing means mounted in surface to surface engagement on opposite sides of said planet roller means to locate and support said sun roller means and said armature within said casing.

30. The invention as defined in claim 29 and wherein said transmission means further comprises a flex spline mounted on said planet roller means, a fixed spline fixedly mounted about said flex spline in mating engagement therewith, and an output spline rotatably supported on said flex spline in mating engagement therewith.

31. The invention as defined in claim 30 and wherein said transmission means further comprises an output hub fixedly connected to said movable spline and extending radially inwardly therefrom, and output drive means centrally connected to said output hub.

32. The invention as defined in claim 31 and wherein said casing partially surrounds said output hub and locates said output spline in mating engagement with said flex spline.

33. The invention as defined in claim 32 and having radially extending bearing means mounted between said output hub and said planet rollers.

34. The invention as defined in claim 29 and wherein said sun roller means comprises an annular member, a first flanged hub portion mounted on one side of said annular member and extending radially outwardly therebeyond, a second flanged hub portion mounted on the other side of said annular member and extending radially outwardly therebeyond, said first and second flanged hub portions receiving said planet roller means therebetween and axially locating said planet roller means.

35. The invention as defined in claim 34 and having a third flanged hub portion extending radially outwardly in axially spaced relationship to said second flanged hub portion, said armature being fixedly mounted between said second flanged hub portion and said third flanged hub portion.

36. The invention as defined in claim 35 and having common connecting means extending through said flanged hub portions and said sun roller to integrally connect said armature and said reduction unit.

37. A power actuator having a flat pancake like peripheral configuration comprising spaced end plate means, centrally located plate means spaced from and extending generally parallel to said end plate means, connecting means extending peripherally about said plate means and forming a casing having a motor means compartment and a reduction means compartment separated by said centrally located plate means, magnet means mounted in said motor compartment, brush means mounted in said motor compartment, a disk type armature rotatably mounted in said motor compartment in spaced relationship to said plate means and said magnet means and in surface engagement with said brush means, sun roller means rotatably mounted in said reduction means compartment in spaced relationship to said plate means, mounting means fixedly mounting said armature on said sun roller means and extending through said centrally located plate means in spaced relationship relative thereto, planet roller means drivably mounted in surface to surface engagement with said sun roller means in said reduction means compartment and radially locating said sun roller means therein, abutment means cooperably axially locating said sun roller means relative to said planet roller means, and output means mounted circumjacent said planet roller means and being drivably associated with said planet roller means and axially and radially locating said planet roller means in said reduction means compartment.

38. The invention as defined in claim 37 and wherein said output means comprises an annular flex spline mounted circumjacent said planet roller means, a fixed spline mounted circumjacent said flex spline, and a movable output spline mounted circumjacent said flex spline.

39. The invention as defined in claim 37 and said plate means having abutment portions adapted to abut and axially locate said planet roller means.

40. The invention as defined in claim 39 and having bearing means interposed between said planet roller means and said abutment portions.

41. The invention as defined in claim 40 and wherein said bearing means comprises ring members.

42. The invention as defined in claim 40 and wherein said planet roller means have a central cavity facing said plate means, and said bearing means comprise hub portions mounted in said central cavity and flange portions extending radially therefrom along the side surfaces of said planet roller means.

43. The invention as defined in claim 39 and wherein said abutment portions are integrally formed in said plate means and are axially offset relative thereto.

44. The invention as defined in claim 38 and wherein one of said end plate means is fixedly connected to said movable output spline and extends radially inwardly therefrom.

45. The invention as defined in claim 38 and wherein at least one of said end plate means and said centrally located plate means are fixed to said fixed spline.

46. The invention as defined in claim 38 and wherein said connecting means includes said fixed spline.

47. The invention as defined in claim 37 and wherein the one of said end plate means adjacent said sun roller means is centrally axially offset and spaced outwardly therefrom, and there being a continuous axial air gap between said sun roller means and said one of said end plate means.

48. A power operated actuator comprising a rotatable output spline, a fixed spline fixedly mounted relative to said rotatable output spline, means axially restraining said rotatable output spline relative to said fixed spline, a flex spline engaged with and mounted circumjacent said rotatable output spline and said fixed spline, means axially restraining said flex spline relative to said fixed spline and said rotatable output spline, wave generator means mounted circumjacent said flex spline and drivably engaged therewith and radially supported thereby, means axially locating said wave generator means relative to said fixed spline, armature means drivably connected to and rotatably supported by said wave generator, and motor means supported in axial and radial spaced relationship to said armature means for imparting rotary motion to said armature means to rotate said output spline through said wave generator means and said flex spline.

49. A brush arrangement for electrically connecting motor components comprising brush means, a surface provided on said brush means for surface engagement with moving motor component, support means for said brush means, a slide surface on said support means inclined to the plane of engagement of said brush means with said motor component, a surface of said brush means being correspondingly inclined and mounted in sliding abutting engagement with said slide surface, and spring means exerting a force on said brush means in a direction substantially parallel to the plane of engagement of said brush means with said motor component and toward said inclined slide surface.

50. The invention as defined in claim 37 and wherein said abutment means comprises axially aligned groove means in said sun roller means and said planet roller means, and retaining ring means mounted in said groove means and extending between and axially locating said sun roller means and said planet roller means.

51. The invention as defined in claim 50 and wherein said retaining ring means further includes radially outwardly extending separator portions located between and circumferentially spacing said planet roller means.

References Cited
UNITED STATES PATENTS

| | | | |
|---|---|---|---|
| 2,548,633 | 4/1951 | Stephenson | 310—83 |
| 2,906,143 | 8/1959 | Musser | 310—83 |
| 3,039,324 | 6/1962 | Waterfield | 74—640 |
| 3,101,009 | 8/1963 | Musser | 74—640 |
| 3,166,949 | 1/1965 | Lapp | 74—640 |
| 3,182,525 | 5/1965 | Tinder | 74—640 |
| 3,190,145 | 6/1965 | Bradley | 74—640 |
| 3,199,370 | 8/1965 | Prior | 74—640 |
| 3,211,262 | 10/1965 | Hoffstrom | 74—640 |
| 3,239,699 | 3/1966 | Ferrary | 74—640 |
| 3,280,353 | 10/1966 | Haydon | 310—154 |
| 3,209,182 | 9/1965 | Spring | 310—83 |
| 3,307,056 | 2/1967 | Wooley | 310—83 |

FOREIGN PATENTS

| | | |
|---|---|---|
| 529,734 | 1/1921 | France. |

LEE T. HIX, *Primary Examiner.*

J. D. MILLER, *Examiner.*